United States Patent [19]

Weber et al.

[11] Patent Number: 6,031,031
[45] Date of Patent: Feb. 29, 2000

[54] THERMOPLASTIC MOLDING COMPOSITIONS BASED ON POLYESTERS AND POLYCARBONATE

[75] Inventors: Martin Weber, Maikammer; Rolf Mülhaupt, Freiburg, both of Germany

[73] Assignee: BASF Aktiengesellschaft, Ludwigshafen, Germany

[21] Appl. No.: 09/146,197

[22] Filed: Sep. 3, 1998

[30] Foreign Application Priority Data

Sep. 10, 1997 [DE] Germany .............. 197 39 686

[51] Int. Cl.$^7$ ...................................... C08F 20/00
[52] U.S. Cl. .............. 524/95; 524/86; 524/104; 524/111; 524/504; 525/64; 525/67; 525/71
[58] Field of Search ................... 525/67, 71, 64; 524/86, 95, 104, 111, 504

[56] References Cited

U.S. PATENT DOCUMENTS

| | | |
|---|---|---|
| 3,651,014 | 3/1972 | Witsiepe et al. . |
| 4,584,360 | 4/1986 | Paul et al. . |
| 4,732,949 | 3/1988 | Paul et al. . |
| 4,902,749 | 2/1990 | Akkapeddi et al. . |
| 5,130,440 | 7/1992 | Krause et al. . |
| 5,731,389 | 3/1998 | Bailly et al. .............. 525/437 |
| 5,762,849 | 6/1998 | Argast et al. .............. 264/176.1 |

FOREIGN PATENT DOCUMENTS

| | | |
|---|---|---|
| 2053876 | 10/1990 | Canada . |
| 42 09 283 | 9/1993 | Germany . |
| 88/08433 | 11/1988 | WIPO . |

OTHER PUBLICATIONS

Kobayashi et al., Dept. of Synt. Chem, Kyoto University, Japan 761–807.
Polymer Letters vol. 5, pp 871–879, (1967).
Jr. of Chem. Soc., Part 11, pp 985–1832, 1975.
Functionalized Polypropylene . . . , Vainio et al., 843–852.
Kunststoffe 83 (1993) 11, Carl hanser Verlag Muenchen, 885–888, Birnbirch et al.

*Primary Examiner*—Mark L. Warzel
*Attorney, Agent, or Firm*—Keil & Weinkauf

[57] ABSTRACT

A thermoplastic molding composition comprises
  A) from 1 to 97% by weight of a thermoplastic polyester
  B) from 1 to 97% by weight of a polycarbonate
  C) from 1 to 40% by weight of an elastomer containing oxazoline groups and having a glass transition temperature $(T_g) \leq 0°$ C.
  D) from 0.05 to 5% by weight of a bisoxazoline
  E) from 0 to 70% by weight of other additives and processing aids,
where the total of the percentages by weight of components A) to E) is 100%.

8 Claims, No Drawings

THERMOPLASTIC MOLDING COMPOSITIONS BASED ON POLYESTERS AND POLYCARBONATE

The invention relates to thermoplastic molding compositions comprising

A) from 1 to 97% by weight of a thermoplastic polyester

B) from 1 to 97% by weight of a polycarbonate

C) from 1 to 40% by weight of an elastomer containing oxazoline groups and having a glass transition temperature $(T_g) \leq 0°$ C.

D) from 0.05 to 5% by weight of a bisoxazoline

E) from 0 to 70% by weight of other additives and processing aids, where the total of the percentages by weight of components A) to E) is 100%.

The invention also relates to the use of such molding compositions for producing fibers, films and moldings, and also to the moldings obtainable in this way.

Polymer mixtures are arousing increasing interest in engineering, since they provide specifically tailored combinations of properties. Of particular interest here are polymer mixtures of incompatible polymers which have unusual combinations of properties.

Polymer mixtures based on polyesters and polycarbonates have been known for some years (U.S. Pat. No. 4,522,797, 4,764,556, 4,897,448, EP-A 180 648, DE-A 33 02 124). In order to improve toughness, in particular at low temperatures, the products important for engineering also contain impact modifiers, use being made in particular of MBS-modifiers, acrylate graft rubbers, and also ethylene copolymers with polar comonomers.

The use of oxazoline-grafted polypropylene as a blend component for polybutylene terephthalate has been disclosed in the literature (cf. T. Vainio et al., J. Appl. Polym. Sci. 61 (1996) 843–852). It has also been disclosed that bisoxazolines can be used for chain extension in polycondensates (P. Birnbrich, H. Fisher, J. D. Klamann and B. Wegemund, Kunststoffe 83, p. 885–888 (1993)). In order to meet demands which are becoming ever more complex, there remains a requirement for polyester/polycarbonate blends which have improved flowability, good low-temperature toughness and better stability during processing.

It is an object of the present invention to provide polyester/polycarbonate molding compositions which have good flowability and low-temperature toughness, and also improved stability during processing.

We have found that this object is achieved by means of the molding compositions defined at the outset. Preferred embodiments are given in the subclaims.

The novel molding compositions contain, as component A), from 1 to 97% by weight, preferably from 10 to 87% by weight and in particular from 15 to 79% by weight of a thermoplastic polyester.

Use is generally made of polyesters based on aromatic dicarboxylic acids and an aliphatic or aromatic dihydroxy compound.

A first class of preferred polyesters is that of polyalkylene terephthalates having from 2 to 10 carbon atoms in the alcohol moiety.

Such polyalkylene terephthalates are known per se and are described in the literature. They contain, in their main chain, an aromatic ring which derives from the aromatic dicarboxylic acid. The aromatic ring may also be substituted, eg. by halogen, such as chlorine and bromine, or by $C_1$–$C_4$-alkyl, such as methyl, ethyl, isopropyl, n-propyl, n-butyl, isobutyl and tert-butyl.

These polyalkylene terephthalates may be prepared by reacting aromatic dicarboxylic acids, or their esters or other ester-forming derivatives, with aliphatic dihydroxy compounds, in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,4-butanediol, 1,6-hexanediol, 1,4-hexanediol, 1,4-cyclohexanediol, 1,4-cyclohexanedimethylanol and neopentyl glycol, or mixtures of these.

Particularly preferred polyesters A) are polyalkylene terephthalates derived from alkanediols having from 2 to 6 carbon atoms. Of these, polyethylene terephthalate and polybutylene terephthalate, or mixtures of these, are particularly preferred.

The viscosity number of the polyesters A) is generally in the range from 70 to 220, preferably from 100 to 150 (measured in a 0.5% strength by weight solution in a mixture of phenol and o-dichlorobenzene in a weight ratio of 1:1 at 25° C.).

Particular preference is given to polyesters whose carboxyl end group content is up to 100 mval/kg, preferably up to 50 mval/kg and in particular up to 40 mval/kg. Such polyesters may be prepared, for example, by the process of DE-A 44 01 055. The carboxyl end group content is usually determined by titration methods (eg. potentiometry).

Another class is that of fully aromatic polyesters derived from aromatic dicarboxylic acids and aromatic dihydroxy compounds.

Suitable aromatic dicarboxylic acids are the compounds described above for the polyalkylene terephthalates. Use is preferably made of mixtures of from 5 to 100 mol % of isophthalic acid and from 0 to 95 mol % of terephthalic acid, in particular mixtures of from about 80% of terephthalic acid with 20% of isophthalic acid to about equivalent mixtures of these two acids.

The aromatic dihydroxy compounds preferably have the formula I

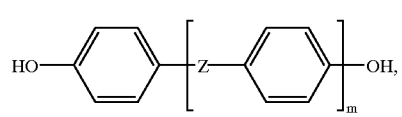

where Z is alkylene or cycloalkylene having up to 8 carbon atoms, arylene having up to 12 carbon atoms, carbonyl, sulfonyl, oxygen or sulfur or a chemical bond and where m is from 0 to 2. The compounds I may also carry $C_1$–$C_6$-alkyl or alkoxy and fluorine, chlorine or bromine as substituents on the phenylene groups.

Examples of typical compounds are
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone, di(hydroxyphenyl) sulfoxide,
α,α'-di(hydroxyphenyl)dialkylbenzene,
di(hydroxyphenyl) sulfone, di(hydroxybenzoyl)benzene, resorcinol and
hydroquinone, and also the ring-alkylated or ring-halogenated derivatives of these.

Preferred compounds among these are
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and also in particular
2,2-di(4'-hydroxyphenyl)propane,
2,2-di(3',5'-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

For the purposes of the present invention, polyesters include aromatic polyestercarbonates, which are obtainable by a reaction with the aromatic dihydroxy compounds mentioned above of the formula I, preferably bisphenol A and 2,2-bis(4-hydroxyphenyl)propane, with phosgene and with aromatic dicarboxylic acids, such as isophthalic acid and/or terephthalic acid.

It is, of course, also possible to use polyester block copolymers, such as copolyetheresters. Such products are known per se and are described in the literature, eg. in U.S. Pat. No. 3,651,014. Corresponding products are also available commercially, eg. Hytrel® (DuPont).

According to the invention, the thermoplastic molding compositions contain, as component B), from 1 to 97% by weight, based on the total of components A to E, of at least one polycarbonate. Preferred novel molding compositions contain from 10 to 87% by weight, based on the total of components A to E, of component B. Particular preference is given to novel molding compositions which contain from 15 to 79% by weight of component B, based on the total of components A to E.

Component B is preferably a halogen-free polycarbonate. Examples of suitable halogen-free polycarbonates are those based on biphenols of the formula I above (see component A) which contain no halogen substituents.

Examples of preferred biphenols of the formula I are hydroquinone, resorcinol, 4,4'-dihydroxybiphenyl, 2,2-bis (4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Both homopolycarbonates and also copolycarbonates are suitable as component B, and preference is given to copolycarbonates of bisphenol A as well as bisphenol A homopolymer.

The suitable polycarbonates may be branched in a known manner, preferably by incorporating from 0.05 to 2.0 mol %, based on the total of the biphenols used, of at least trifunctional compounds, for example those having three or more phenolic OH groups.

Polycarbonates which have proven particularly suitable are those which have relative viscosities $\eta_{rel}$ of from 1.10 to 1.50, in particular from 1.25 to 1.40. This corresponds to average molecular weights $M_w$ (weight-average) of from 10,000 to 200,000, preferably from 20,000 to 80,000.

The biphenols of the formula I are known per se or can be prepared by known processes.

The polycarbonates may be prepared, for example, by reacting the biphenols with phosgene in the interfacial process or with phosgene in the homogeneous phase process (known as the pyridine process), the molecular weight to be set in each case being achieved in a known manner by means of an appropriate amount of known chain terminators. (In relation to polydiorganosiloxane-containing polycarbonates, see, for example, DE-A-33 34 782).

Examples of suitable chain terminators are phenol, p-tert-butylphenol, or else long-chain alkylphenols, such as 4-(1, 3-tetra-methylbutyl)phenol, in accordance with DE-A-28 42 005 or monoalkylphenols or dialkylphenols with a total of from 8 to 20 carbon atoms in the alkyl substituents in accordance with DE-A-35 06 472, for example p-nonylphenol, 3,5-di-tert-butyl-phenol, p-tert-octylphenol, p-dodecylphenol, 2-(3,5-dimethyl-heptyl)phenol and 4-(3,5-dimethylheptyl)phenol.

For the purposes of the present invention, halogen-free polycarbonates are polycarbonates built up from halogen-free biphenols, halogen-free chain terminators and, if desired, halogen-free branching agents, and whose content of subordinate ppm amounts of hydrolyzable chlorine resulting, for example, from their preparation using phosgene in the interfacial process, should not lead to their being regarded as halogen-containing for the purposes of the invention. Such polycarbonates having ppm contents of hydrolyzable chlorine are halogen-free polycarbonates for the purposes of the present invention.

The mixing ratio of components A) to B) may generally be as desired. Preference is given to ratios of A):B) of from 10:90 to 90:10 and in particular from 15:85 to 85:15.

The novel molding compositions contain, as component C), from 1 to 40% by weight, preferably from 2 to 20% by weight and in particular from 5 to 15% by weight of an elastomer containing oxazoline groups (often also termed impact modifier or rubber) having a glass transition temperature $(T_g) \leq 0°$ C., preferably $\leq -15°$ C. (determined using differential scanning calorimetry (DSC) at a heating rate of 10 K/min).

Preference is given to the incorporation into the elastomer C) of monomers based on 2-oxazolines of the formula II in amounts of from 0.1 to 5% by weight, preferably from 0.2 to 2% by weight and in particular from 0.1 to 1% by weight, based on 100% by weight of C):

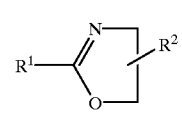

II where:
 $R^1$ is an aliphatic, cycloaliphatic, aromatic or araliphatic hydrocarbon radical having from 2 to 60, preferably from 2 to 30, carbon atoms, which may contain hydroxyl, carboxyl or amide groups if desired, and
 $R^2$ is hydrogen or $C_1$–$C_4$-alkyl, preferably methyl or hydrogen.

For the purposes of the invention, incorporation of the 2-oxazolines is the incorporation of these monomers into the polymer chain by copolymerization or by grafting onto the polymer chain, the latter method being preferred.

Preferred radicals $R^1$ are

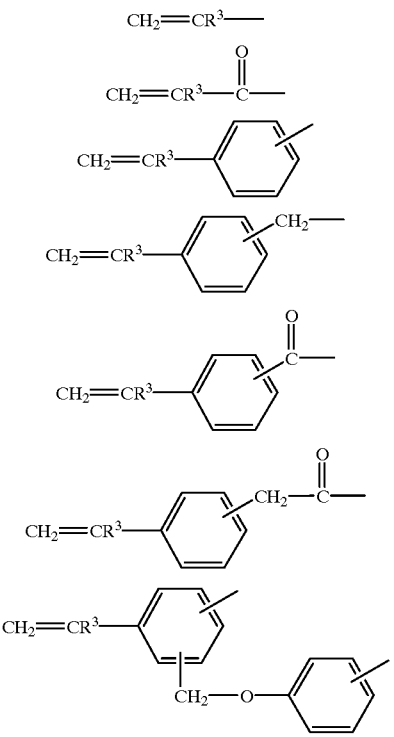

where $R^3$ can be hydrogen, or alkyl or alkoxy having in each case from 1 to 6 carbon atoms, eg. methyl, isopropyl, n-propyl or butyl, $R^3$ being preferably hydrogen or methyl.

An example of such 2-vinyl-2-oxazolines is 2-isopropenyl-2-oxazoline.

Processes for preparing these compounds are disclosed, for example, in U.S. Pat. No. 4,902,749 and WO 88/08433.

Other preferred 2-oxazolines are those sometimes called 2-fatty-alkyl-2-oxazolines, which are obtainable from unsaturated fatty acid ethanolamides by cyclodehydration, in accordance with the processes described in DE-A 38 24 982, DE-A 39 14 159 and DE-A 42 09 283. Examples of suitable oxazolines are those obtainable from the ethanolamide of oleic acid, of linoleic acid, of linolenic acid, of palmitoleic acid, of gadoleic acid, of erucic acid or of arachidonic acid. Suitable oxazolines can also be prepared by cyclodehyration from the ethanolamides of industrial fatty acid mixtures, as obtained from vegetable and animal oils, if desired after separating off the saturated fatty acid, and composed predominantly of mixtures of the singly and multiply unsaturated fatty acids mentioned above. Fatty acids with multiple conjugated unsaturation, which can be prepared by double-bond isomerization from the naturally occurring multiply unsaturated fatty acids, are also suitable in the form of their ethanolamides for cyclodehydration to form 2-alkenyl-substituted oxazolines.

Other suitable preparation processes for monomers containing oxazoline groups are the reaction, proposed in DE-A 19 606 198, of monomers containing nitrile groups with aminoalcohols, the dehydration of N-(2-hydroxyethyl) carboxamides, which can be obtained by reacting carboxylic acids and/or carboxylic esters with aminoethanol (S.

Kobayashi, T. Saegusa in Ring-Opening Polymerisation (ed. K. J. Ivin, T. Saegusa), Elsevier Applied Science Publishers, London and New York 1984, p. 761–807) dehydrohalogenation of haloamides, which can be prepared by halogenating N-(2-hydroxyethyl)carboxamides, and also a reaction of nitriles with epoxides, with acid catalysis (J. R. L. Smith, R. O. C. Norman, M. R. Stillings, J. Chem. Soc. Perkin Trans. I, 1975, p. 1200–1202). The dehydrohalogenation takes place using strong bases, eg. potassium hydroxide or alcoholates (T. G. Bassiri, A. Levy, M. Litt, Polym. Lett. 5, p. 871, 1967).

Preferred compounds are

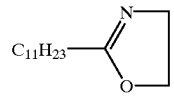

undecyl-2-oxazoline,
soya-2-oxazoline with $R^1$=—$(CH_2)_7$—CH=CH—$CH_2$CH=CH—$(CH_2)_4$—$CH_3$ or —$(CH_2)_7$—CH=CH—$(CH_2)_7$—$CH_3$ and
ricinus-2-oxazoline

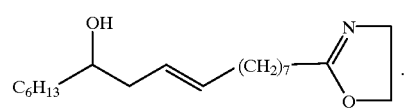

Very particular preference is given to
2-ricinus-2-oxazolines, such as ricinus-2-oxazoline methacrylate

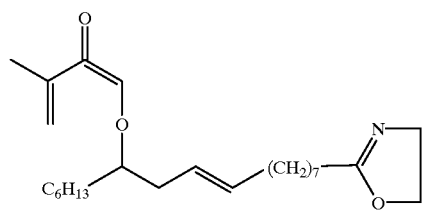

and
ricinus-2-oxazoline maleate

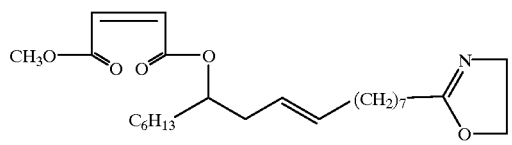

which are obtainable in accordance with DE-A 42 09 283 from the corresponding 2-(hydroxyalkyl)oxazolines by reacting with, for example, α,β-unsaturated esters, such as methyl methacrylate or dimethyl maleate, in the presence of a tranesterification catalyst, with elimination of alcohol.

The elastomers C) are very generally copolymers which are preferably built up from at least two of the following monomers: ethylene, propylene, octene, butylene, butadiene, isobutene, isoprene, chloroprene, vinyl acetate, styrene, acrylonitrile, and esters of acrylic and/or methacrylic acid with from 1 to 18 carbon atoms in the alcohol component.

Such polymers are described, for example, in Houben-Weyl, Methoden der organischen Chemie, Vol. 14/1 (Georg-Thieme-Verlag, Stuttgart, 1961) pages 392 to 406 and in the monograph of C. B. Bucknall, Toughened Plastics (Applied Science Publishers, London, 1977).

Preferred elastomers C) are polymers based on olefins and built up from the following components $C_1$) from 40 to 100% by weight of at least one α olefin having from 2 to 8 carbon atoms, $C_2$) from 0 to 50% by weight of a diene, $C_3$) from 0 to 45% by weight of a $C_1$–$C_{12}$-alkyl ester of acrylic acid or of methacrylic acid or mixtures of such esters, and $C_4$) from 0.1 to 5% by weight of a 2-oxazoline of the formula II with the proviso that component C) is not an olefin homopolymer.

A first preferred class is that of ethylene-propylene (EPM) and ethylene-propylene-diene (EPDM) rubbers, which preferably have a ratio of ethylene to propylene in the range from 40:60 to 90:10.

The Mooney viscosities (MLI+4/100° C.) of such, preferably not crosslinked, EPM and EPDM rubbers (gel contents generally below 1% by weight) are preferably in the range from 25 to 100, in particular from 35 to 90 (measured with the large rotor after a running time of 4 minutes at 100° C. in accordance with DIN 53 523).

EPM rubbers generally have virtually no remaining double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyl-tricyclo-[5.2.1.0$^{2,6}$]-3, 8-decadiene or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

Other suitable non-conjugated dienes are acyclic dienes, such as 1,6-octadiene, 3,7-dimethyl-1,6-octadiene and alicyclic dienes, such as 4-vinylcyclohexene.

The diene content of the EPDM rubbers is preferably from 0.5 to 50% by weight, in particular from 1 to 8% by weight, based on the total weight of the rubber.

In addition, suitable polyolefin copolymers are obtainable by polymerization in the presence of a metallocene catalyst.

Particularly preferred elastomers C) are polyethyleneoctene copolymers and polyethylenebutene copolymers with a proportion of up to 50% by weight, preferably up to 45% by weight, of octene and/or butene.

A further class of preferred olefin polymers is that of copolymers of α olefins having from 2 to 8 carbon atoms, in particular of ethylene, with $C_1$–$C_{18}$-alkyl esters of acrylic and/or methacrylic acid.

In principle, any primary or secondary $C_1$–$C_{18}$-alkyl ester of acrylic or methacrylic acid is suitable, but preference is given to esters having from 1 to 12 carbon atoms, in particular having from 2 to 10 carbon atoms.

Examples of these are methyl, ethyl, propyl, n-butyl, isobutyl, 2-ethylhexyl, octyl and decyl acrylates, and the corresponding methacrylates. Of these, particular preference is given to n-butyl acrylate and 2-ethylhexyl acrylate.

The proportion of the methacrylates and acrylates $C_3$) in the olefin polymers is from 0 to 45% by weight, preferably from 0.1 to 42.5% by weight and in particular from 0.5 to 41% by weight.

Another preferred class of the elastomers C) is that of ABS, ASA and HIPS (high impact polystyrene) polymers.

Merely as examples, mention may be made here of vinylaromatic polymers of styrene, chlorostyrene, α-methylstyrene and p-methylstyrene; subordinate proportions (preferably not more than 20% by weight, in particular not more than 8% by weight) of comonomers, such as (meth)acrylonitrile or (meth)acrylate may also be involved in the structure. A particularly preferred vinylaromatic polymer is toughened polystyrene. Mixtures of these polymers may, of course, also be used. Preparation is preferably by the process described in EP-A-302 485.

Preferred ASA polymers are built up from a soft or rubber phase of:

$C_1$ from 50 to 90% by weight of a graft base based on $C_{11}$ from 95 to 99.9% by weight of a $C_2$–$C_{10}$-alkyl acrylate and $C_{12}$ from 0.1 to 5% by weight of a bifunctional monomer having two non-conjugated olefinic double bonds, and $C_2$ from 10 to 50% by weight of a graft of $C_{21}$ from 20 to 50% by weight of styrene or of substituted styrenes of the formula III or mixtures of these, and $C_{22}$ from 10 to 80% by weight of acrylonitrile, methacrylonitrile, acrylates or methacrylates or mixtures of these, in a mixture with a hard matrix based on an SAN copolymer $C_3$ of:

$C_{31}$ from 50 to 90% by weight, preferably from 55 to 90% by weight and in particular from 65 to 85% by weight, of styrene and/or of substituted styrenes of the formula III, and $C_{32}$ from 10 to 50% by weight, preferably from 10 to 45% by weight and in particular from 15 to 35% by weight, of acrylonitrile and/or methacrylonitrile.

Component $C_1$) is an elastomer which has a glass transition temperature of below –20° C., in particular below –30° C.

The main monomers $C_{11}$ used for preparing the elastomer are acrylates having from 2 to 10 carbon atoms, in particular from 4 to 8 carbon atoms. Particularly preferred monomers here are tert-butyl, isobutyl and n-butyl acrylate, and also 2-ethylhexyl acrylate, the two last named being particularly preferred.

Besides these acrylates, use is made of from 0.1 to 5% by weight, in particular from 1 to 4% by weight, based on the total weight $C_{11}+C_{12}$, of a polyfunctional monomer having at least two non-conjugated olefinic double bonds. Of these, particular preference is given to the use of bifunctional compounds, ie. those having two non-conjugated double bonds. Examples which may be mentioned here are divinylbenzene, diallyl fumarate, diallyl phthalate, triallyl cyanurate, triallyl isocyanurate, tricyclodecenyl acrylate and dihydrodicyclopentadienyl acrylate, of which the two last named are particularly preferred.

Processes for preparing the graft base $C_1$ are known per se and are described, for example, in DE-B 1 260 135. Corresponding products are also obtainable commercially.

Preparation by emulsion polymerization has proven particularly advantageous in some cases.

The precise polymerization conditions, in particular the type, method of addition and amount of the emulsifier are preferably selected so that the acrylate latex, which is at least to some extent crosslinked, has an average particle size (weight average $d_{50}$) in the range from about 200 to 700 nm, in particular from 250 to 600 nm. The latex preferably has a narrow particle size distribution, ie. the quotient $$Q = \frac{d_{90} - d_{10}}{d_{50}}$$

is preferably smaller than 0.5, in particular smaller than 0.35.

The proportion of the graft base $C_1$ in the graft polymer $C_1+C_2$ is from 50 to 90% by weight, preferably from 55 to 85% by weight and in particular from 60 to 80% by weight, based on the total weight of $C_1+C_2$.

Onto the graft base $C_1$ there is grafted a graft shall $C_2$, obtainable by copolymerizing $C_{21}$ from 20 to 90% by weight, preferably from 30 to 90% by weight and in particular from 30 to 85% by weight, of styrene or of substituted styrenes of the formula III

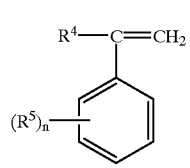

where $R^4$ is alkyl having from 1 to 8 carbon atoms, hydrogen or halogen, and $R^5$ is alkyl having from 1 to 8 carbon atoms or halogen, and n is 0, 1, 2 or 3, and $C_{22}$ from 10 to 80% by weight, preferably from 10 to 70% by weight and in particular from 15 to 70% by weight, of acrylonitrile, methacrylonitrile, acrylates or methacrylates or mixtures of these.

Examples of substituted styrenes are α-methylstyrene, p-methylstyrene, p-chlorostyrene and p-chloro-α-methylstyrene, styrene and α-methylstyrene being preferred.

Preferred acrylates and methacrylates are those whose homopolymers or, as appropriate, copolymers with the other monomers of component $C_{22}$ have glass transition temperatures of above 20° C.; in principle, however, it is also possible to use other acrylates, preferably in amounts which result in a glass transition temperature $T_g$ of above 20° C. overall for component $C_2$.

Particular preference is given to esters of acrylic or methacrylic acid with $C_1$–$C_8$ alcohols and esters containing epoxy groups, such as glycidyl acrylate and glycidyl methacrylate. Very particularly preferred examples are methyl methacrylate, tert-butyl methacrylate, glycidyl methacrylate and n-butyl acrylate, the last named preferably not being used in too high a proportion, because it forms polymers with very low $T_g$.

The graft shell $C_2$ may be prepared in one or more steps, eg. in two or three steps, the overall formulation remaining unaffected thereby.

The graft shell is preferably prepared in emulsion, as described, for example, in DE-C 12 60 135, DE-A 32 27 555, DE-A 31 49 357 and DE-A 34 14 118.

Depending on the conditions selected, the graft copolymerization gives a certain proportion of free copolymers of styrene and/or of substituted styrene derivatives, and of (meth)acrylonitrile and/or of (meth)acrylates.

The graft copolymer $C_1+C_2$ generally has an average particle size of from 100 to 1000 rim, in particular from 200 to 700 nm ($d_{50}$ weight average). The conditions for preparing the elastomer $C_1$ and for the grafting are therefore preferably selected so that they result in particle sizes in this range. Measures for this are known and are described, for example, in DE-C 1 260 135 and DE-A 28 26 925, and also in Journal of Applied Polymer Science, Vol. 9 (1965), p. 2929–2938. The increase in particle size of the elastomer latex may, for example, be brought about by agglomeration.

For the purposes of the present invention, the free, non-grafted homo- and copolymers produced during the graft copolymerization to prepare component $C_2$ also count as part of the graft polymer $C_1+C_2$.

Some preferred graft polymers are listed below:

1: 60% by weight of graft base $C_1$ made from $C_{11}$ 98% by weight of n-butyl acrylate and $C_{12}$ 2% by weight of dihydrodicyclopentadienyl acrylate and 40% by weight of graft shell $C_2$ made from $C_{21}$ 75% by weight of styrene and $C_{22}$ 25% by weight of acrylonitrile 2: graft base as in 1 with 5% by weight of a first graft shell made from styrene and 35% by weight of a second graft made from $C_{21}$ 75% by weight of styrene and $C_{22}$ 25% by weight of acrylonitrile 3: graft base as in 1 with 13% by weight of a first graft made from styrene and 27% by weight of a second graft made from styrene and acrylonitrile in a weight ratio of 3:1.

The products obtained as component $C_3$ may be prepared, for example, by the processes described in DE-B 10 01 001 and DE-B 10 03 436. Such copolymers are also available commercially. The weight-average molecular weight determined by light scattering is preferably in the range from 50,000 to 500,000, in particular from 100,000 to 250,000.

The weight ratio of $(C_1+C_2):C_3$ is in the range from 1:2.5 to 2.5:1, preferably from 1:2 to 2:1 and in particular from 1:1.5 to 1.5:1.

ABS polymers as polymers C) in the novel polymer mixtures have the same structure as that described above for ASA polymers. Instead of the acrylate rubber $C_1$ of the graft base in the ASA polymer, conjugated dienes are usually used, resulting preferably in the following formulation for the graft base $C_4$:

$C_{41}$ from 70 to 100% by weight of a conjugated diene and
$C_{42}$ from 0 to 30% by weight of a bifunctional monomer having two non-conjugated olefinic double bonds.

Graft $C_2$ and the hard matrix of the SAN copolymer $C_3$ remain unaltered in the formulation. Such products are commercially available. The preparation processes are known to the person skilled in the art, and it is therefore not necessary to give further information on this topic.

The weight ratio of $(C_4+C_2):C_3$ is in the range from 3:1 to 1:3, preferably from 2:1 to 1:2.

The grafting of the above elastomers C), preferably of the olefin polymer, with the monomers containing oxazoline groups preferably takes place in the presence of initiators in the melt.

Suitable initiators preferably have, at the respective processing temperatures, a half-life time of from 30 to 40 s and a very high grafting efficiency (high H atom abstraction capability).

At processing temperatures of 200° C. and above, compounds particularly suitable for this are those such as di-tert-butyl peroxide, dicumyl peroxide, bis(tert-butylperoxyisopropyl)benzene and 2,5-bis(tert-butylperoxy)-2,5-dimethylhexane.

For further details, reference may be made at this point to P. Bernbrich et al., Kunststoffe 83 (1993), p. 885–888.

The novel molding compositions contain, as component D), from 0.05 to 5% by weight, preferably from 0.1 to 4% by weight and in particular from 0.5 to 1% by weight of a bisoxazoline of the formula IV

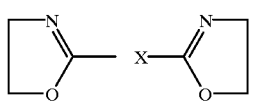

where
X is a saturated, unsaturated, aliphatic or cycloaliphatic radical having from 2 to 60 carbon atoms or an araliphatic or aromatic radical having from 6 to 60 carbon atoms, where X may contain carboxyl and amide groups.

Examples of these compounds are 2-(1,3-oxazolin-2-yl)-1,3-oxazoline, bis(1,3-oxazolin-2-yl)-1,4-phenylene and bis (1,3-oxazolin-2-yl)-1,4-butane, which are obtainable by reacting dicarboxylic esters with aminoethanol, followed by dehydration in sulfuric acid.

Preferred bisoxazolines are those of the formula IV in which X is a radical of the formula V

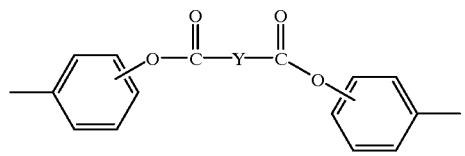

where Y is a hydrocarbon radical having from 1 to 24 carbon atoms.

A particularly preferred compound is

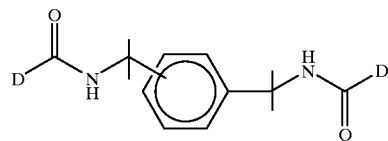

where
D is

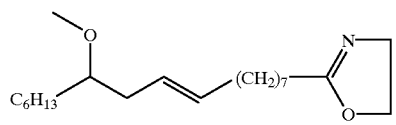

which is obtainable by reacting ricinus-2-oxazoline with tetra-methylxylene diisocyanate (see B. Birnbrich et al., Kunststoffe 83 (1993), p. 885–888).

The novel thermoplastic molding compositions may contain, as component E), other processing aids, such as stabilizers, oxidation inhibitors, agents to counteract decomposition by heat and by ultraviolet light, lubricants, mold-release agents, colorants, such as dyes and pigments, nucleating agents, plasticizers, etc.

Examples of oxidation inhibitors and heat stabilizers are sterically hindered phenols, hydroquinones, aromatic secondary amines, such as diphenylamines, various substituted representatives of this class, and mixtures of these in concentrations of up to 1% by weight, based on the weight of the thermoplastic molding compositions.

The UV stabilizers used, generally in amounts of up to 2% by weight, based on the molding composition, are various substituted resorcinols, salicylates, benzotriazoles and benzophenones.

Inorganic pigments, such as titanium dioxide, Ultramarine blue, iron oxide and carbon black, and organic pigments, such as phthalocyanines, quinacridones and perylenes, and dyes, such as nigrosin and anthraquinones, may be added as colorants.

Examples of fibrous or particulate fillers are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular up to 40% by weight.

Sodium phenylphosphinate, alumina or silica, and also preferably talc, may be used as nucleating agents.

Lubricants and mold-release agents, which are usually used in amounts of up to 1% by weight, are preferably long-chain fatty acids (eg. stearic acid or behenic acid), salts of these (eg. Ca or Zn stearate), and also amide derivatives (eg. ethylenebisstearylamide) or montan waxes (mixtures of straight-chain, saturated carboxylic acids with chain lengths of from 28 to 32 carbon atoms), low-molecular-weight polyethylene waxes or low-molecular-weight polypropylene waxes.

Examples of plasticizers are dioctyl phthalate, dibenzyl phthalate, butyl benzyl phthalate, hydrocarbon oils and N-(n-butyl)benzenesulfonamide.

The novel molding compositions may also contain from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with smaller proportions (generally up to 50% by weight) of copolymerizable ethylenically unsaturated monomers. These are described, for example, by Schildknecht in "Vinyl and Related Polymers", Wiley-Verlag, 1952, pages 484–494 and by Wall in "Fluorpolymers" (Wiley Interscience, 1972).

These fluorine-containing ethylene polymers are present in the molding compositions in homogeneously distributed form and preferably have a particle size $d_{50}$ (number-average) in the range from 0.05 to 10 $\mu$m, in particular from 0.1 to 5 $\mu$m. These small particle sizes may be achieved particularly preferably by using aqueous dispersions of fluorine-containing ethylene polymers and incorporating these into a polyester melt.

For better compatibility with the thermoplastic polyester, minerals and fillers are, if desired, provided with a coupling agent. Preference is given to glycidyl-, vinyl- and aminoalkyltrialkoxysilanes.

Suitable flame retardants E) may be present in the novel molding compositions in amounts of from 0 to 30% by weight, preferably from 1 to 25% by weight and in particular from 10 to 20% by weight, based on the total weight of components A) to E).

In the case of component E), these are organic and inorganic phosphorus-containing compounds in which the phosphorus is in a valence state of from −3 to +5. For the purposes of the invention, the valence state is the "oxidation state", as set out by A. F. Hollemann and E. Wiberg in Lehrbuch der Anorganischen Chemie, Walter des Gruyter and Co. (1964, 57th to 70th edition), pages 166–177. Phosphorus compounds of valence states from −3 to +5 are derived from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

From the large number of phosphorus-containing compounds, only a few examples are mentioned.

Examples of phosphorus compounds of the phosphine class, which have the valence state −3, are aromatic phosphines, such as triphenylphosphine, tritolylphosphine, trinonylphosphine and trinaphthylphosphine. Triphenylphosphine is particularly suitable.

Examples of phosphorus compounds of the diphosphine class, which have the valence state −2, are tetraphenyldiphosphine and tetranaphthyldiphosphine. Tetranaphthyldiphosphine is particularly suitable.

Phosphorus compounds of the valence state −1 are derived from phosphine oxide.

Suitable phosphine oxides have the formula VI

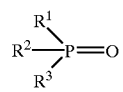

VI where $R^1$, $R^2$ and $R^3$ are identical or different and are alkyl, aryl, alkylaryl or cycloalkyl having from 8 to 40 carbon atoms.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)phosphine oxide, benzylbis (cyclohexyl)phosphine oxide, benzylbisphenylphosphine oxide and phenylbis(n-hexyl)-phosphine oxide. Particular preference is given to the use of triphenylphosphine oxide, tricyclohexylphosphine oxide, tris(n-octyl)phosphine oxide and tris(cyanoethyl)phosphine oxide.

Compounds which are likewise suitable are triphenylphosphine sulfide and its derivatives corresponding to the phosphine oxides described above.

Phosphorus of the valence state ±0 is elemental phosphorus. Red and black phosphorus are possible, red phosphorus being preferred.

Examples of phosphorus compounds of the "oxidation state"+1 are hypophosphites. They may have the character of salts or be purely organic. Examples of these are calcium hypophosphite and magnesium hypophosphite and, besides these, double and complex hypophosphites, and organic hypophosphites, such as cellulose hypophosphite esters, esters of hypophosphorus acids with diols, such as that of 1,10-dodecanediol. It is also possible to use substituted phosphinic acids and anhydrides of these, eg. diphenylphosphinic acid. Other possible compounds are diphenylphosphinic acid, di-p-tolylphosphinic acid and dicresylphosphinic anhydride, and also inter alia compounds such as bis(diphenylphosphinic acid) esters of hydroquinone, ethylene glycol and propylene glycol. Other suitable compounds are aryl(alkyl)phosphinic amides, such as diphenylphosphinic dimethylamide and sulfonamidoaryl(alkyl) phosphinic acid derivatives, such as p-tolylsulfonamidodiphenylphosphinic acid. Preference is given to the use of bis(diphenylphosphinic acid) esters of hydroquinone and of ethylene glycol, and to hydroquinone bisdiphenylphosphinate.

Phosphorus compounds of the oxidation state +3 are derived from phosphorous acid. Suitable compounds are cyclic phosphonates derived from pentaerythritol, neopentyl glycol or pyrocatechol. Phosphorus of the valence state +3 is also present in triaryl-(alkyl) phosphites, such as triphenyl phosphite, tris(4-decyl-phenyl) phosphite, tris(2,4-di-tert-butylphenyl) phosphite and phenyl didecyl phosphite. Further examples are, however, diphosphites, such as propylene glycol 1,2-bis(diphosphite) and cyclic phosphites derived from pentaerythritol, neopentyl glycol or pyrocatechol.

Particular preference is given to methyl neopentyl glycol phosphonate and phosphite, and dimethyl pentaerythritol diphosphonate and phosphite.

Possible phosphorus compounds of the oxidation state +4 are especially hypodiphosphates, such as tetraphenyl hypodiphosphate and bisneopentyl hypodiphosphate.

Examples of phosphorus compounds of the oxidation state +5 are especially alkyl- and aryl-substituted phosphates, such as phenyl bisdodecyl phosphate, phenyl ethyl hydrogen phosphate, phenyl bis(3,5,5-trimethylhexyl) phosphate, ethyl diphenyl phosphate, 2-ethylhexyl ditolyl phosphate, diphenyl hydrogen phosphate, bis(2-ethylhexyl)-p-tolyl phosphate, tritolyl phosphate, bis(2-ethylhexyl) phenyl phosphate, dinonyl phenyl phosphate, phenyl methyl hydrogen phosphate, didodecyl p-tolyl phosphate, p-tolyl bis(2,5,5-trimethylhexyl) phosphate and 2-ethylhexyl diphenyl phosphate. Phosphorus compounds in which every radical is aryloxy are particularly suitable. Triphenyl phosphate and resorcinol bis(diphenyl) phosphate and its ring-substituted derivatives are very particularly suitable.

Cyclic phosphates may moreover also be used, diphenyl pentaerythritol diphosphate and phenyl neopentyl phosphate being particularly suitable.

Besides the abovementioned low-molecular-weight phosphorus compounds, oligomeric and polymeric phosphorus compounds are also suitable.

Halogen-free polymeric organic phosphorus compounds of this type, having phosphorus in the polymer chain, are formed, for example, in the preparation of pentacyclic unsaturated phosphine dihalides, as described, for example, in DE-A 20 36 173. The molecular weight of the polyphospholine oxides measured by vapor-pressure osmometry in dimethylformamide is said to be in the range from 500 to 7000, preferably from 700 to 2000.

Here, phosphorus has the oxidation state −1.

Inorganic coordination polymers of aryl(alkyl)phosphinic acids, such as poly-β-sodium(I) methylphenylphosphinate, may also be used. Their preparation is given in DE-A 31 40 520. The phosphorus has the oxidation number +1.

Halogen-free polymeric phosphorus compounds of this type can furthermore result from the reaction of a phosphonic acid chloride, such as phenyl-, methyl-, propyl-, styryl- or vinylphosphinic acid dichloride, with dihydric phenols, such as hydroquinone, resorcinol, 2,3,5-trimethylhydroquinone, bisphenol A or tetramethylbisphenol A.

Other halogen-free polymeric phosphorus compounds which may be present in the novel molding compositions are prepared by reacting phosphoryl chloride or phosphoric ester dichlorides with a mixture of mono-, di- and trihydric phenols and other hydroxyl-containing compounds (cf. Houben-Weyl-Müller, Thieme-Verlag Stuttgart, Organische Phosphorverbindungen Teil II (1963)). Furthermore, polymeric phosphonates can be prepared by transesterification of phosphonates with dihydric phenols (cf. DE-A 29 25 208) or by reaction of phosphonates with diamines, diamides or hydrazides (cf. U.S. Pat. No. 4,403,075). The inorganic compound poly(ammonium phosphate) is, however, also suitable.

Use may also be made of oligomeric pentaerythritol phosphites, phosphates and phosphonates according to EP-B 8 486, eg. Mobil Antiblaze® 19 (registered trademark of Mobil Oil).

Other halogen-free flame retardants are melamine cyanurate, magnesium hydroxide and mixtures of alkaline-earth metal carbonates.

The novel thermoplastic molding compositions may be prepared by processes known per se, by mixing the starting components in usual mixing apparatus, such as screw extruders, Brabender mixers or Banbury mixers, and then extruding the same. After extrusion, the extrudate is cooled and comminuted.

The sequence of mixing the components may be varied, and it is therefore possible to premix two or, if desired, three components, but it is also possible to mix all of the components together.

Intensive and thorough mixing is advantageous to obtain a very homogeneous mixture. Average mixing times of from 0.2 to 30 minutes at temperatures of from 160 to 320° C., preferably from 200 to 300° C., are generally required. After extrusion, the extrudate is generally cooled and comminuted.

The novel molding compositions have good homogeneity, and also improved toughness and stability during processing.

Because of the properties mentioned, and their high heat resistance, these molding compositions are suitable for producing moldings, which can be used, for example, in the domestic, electrical, motor vehicle and medical engineering sectors.

EXAMPLES

Component A

Polybutylene terephthalate with a viscosity number of 130 ml/g and a carboxyl end group content of 34 mval/kg (Ultradur® B 4500 from BASF AG) (VN measured in 0.5% strength by weight phenol/ortho-dichlorobenzene solution, 1:1 mixture, at 25° C.).

Component B

Polycarbonate based on bisphenol A, (Lexan®161 from General Electric) with a viscosity number of 61.2 ml/g (measured in 0.5% strength by weight $CH_2Cl_2$ solution at 23° C.).

Component C

Preparation of the oxazoline-containing elastomer C) In a twin-screw extruder (ZSK 30, Werner & Pfleiderer), 6 kg of an ethylene octene copolymer with a proportion of 26% by weight of octene (Engage® 8150 from Dow Chemical), 120 g of ricinus-2-oxazoline maleate (Loxamid® VEP 8515 from Henkel KGA) and 6 g of di-tert-butyl peroxide were reacted at 210° C.

The graft reaction was carried out as follows:
within a period of 30 sec addition of the rubber, 1 min melting at 210° C., within a period of 30 sec metering in of the oxazoline, 5 min grafting.
The melt was devolatilized and extruded, cooled with a water bath and granulated.

The degree of grafting was determined by quantitative FTIR spectroscopy of the raw product and of a reprecipitated specimen (twice, in acetone) as 0.4%. The degree of grafting P is defined as follows:
P=weight (grafted product=oxazoline+rubber)/weight of rubber·100.
The grafting yield (weight of grafted oxazoline/total weight of oxazoline) was 20%.

Component C(comp.)

A graft polymer with a graft core made from 70% by weight of butadiene and 14.4% by weight of styrene and a shell made from 15.6% by weight of methyl methacrylate, featuring glass transition temperatures of −77° C. and 82° C. (DSC, 20 K/min heating rate).

(Paroloid® EXL 3600 from Rohm & Haas)

Component D

Bisoxazoline of the formula where

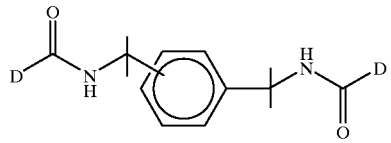

D=

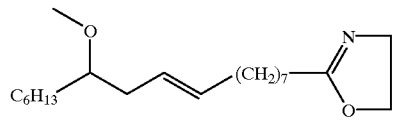

Component E/1

Glass fiber rovings with a diameter of 10 μm made from E glass and provided with an epoxy size Component E/2

Talc, eg. IT-Extra average particle size of 4.9 μm (determined in a suspension cell, the liquid being deionized water)

Component E/3

Tetrakis(2,4-di-tert-butylphenyl) 4,4'-diphenylenediphosphonite with a melting range of from 75 to 95° C. (Irgaphos® P-EPQ from Ciba-Geigy AG)

Preparation and testing of the molding compositions

Components A) to E) were blended in a twin-screw extruder at from 250 to 260° C. and extruded into a water bath. After granulation and drying, test specimens were injection molded and tested.

The heat resistance was determined as HDT B in accordance with ISO 75 B. The breaking strength and elongation at break of the products was determined in accordance with ISO 527 on tensile specimens, likewise the modulus of elasticity. The notched impact strength of the products was determined on ISO specimens in accordance with ISO 179 1eA.

The fracture energy was measured in accordance with DIN 53 433 at −30° C.

The intrinsic color of the products was assessed qualitatively and allocated into classes p.: pale, s.y.: slightly yellowish, y.: yellow.

The stability during processing was determined by measuring the melt viscosity at 270° C. over a period of 20 minutes. The shear rate was 55 $s^{-1}$. The value given is calculated as follows:

$$\Delta = \frac{\eta_5 - \eta_{25}}{\eta_5} \cdot 100\%$$

$\eta_5$ = melt viscosity after 5 min.
$\eta_{25}$ = melt viscosity after 25 min.

The formulations of the molding compositions and the results of the measurements are given in Tables 1 and 2.

TABLE 1

| Component [% by weight] | Example 1 comp. | Example 2 comp. | Example 1 | Example 2 | Example 3 comp. | Example 4 comp. |
|---|---|---|---|---|---|---|
| A | 39 | 39 | 39 | 39 | 39 | 37 |
| B | 50 | 50 | 50 | 50 | 50 | 47.5 |
| C | — | 10 | 9.5 | 9 | — | 9 |
| C (comp.) | 10 | — | — | — | 9 | — |
| D | — | — | 0.5 | 1 | 1 | 5.5 |
| E/3 | 1 | 1 | 1 | 1 | 1 | 1 |
| HDT B [° C.] | 96 | 97 | 98 | 99 | 97 | 99 |
| Mod. of elas. [N/mm²] | 2300 | 2350 | 2350 | 2340 | 2330 | 2370 |
| $\delta_B$ [N/mm²] | 53 | 55 | 58 | 59 | 52 | 48 |
| $\epsilon_b$ [%] | 67 | 78 | 156 | 190 | 78 | 67 |
| $a_k$ [kJ/m²] | 54 | 56 | 67 | 72 | 48 | 46 |
| $W_{s, -30° C.}$ [Nm] | 56 | 53 | 76 | 82 | 45 | 34 |
| Intrinsic color | s.y. | p. | p. | p. | p. | y. |
| $\Delta$ [%] | 66 | 37 | 21 | 24 | 63 | 76 | comp.: Comparative examples

The experiments confirm the excellent property profile of the novel thermoplastic molding compositions, and particular emphasis is given to the increase in toughness and the improvement in stability during processing.

TABLE 2

| Component [% by weight] | Example 3 comp. | Example 6 comp. | Example 3 | Example 7 comp. | Example 8 comp. | Example 4 |
|---|---|---|---|---|---|---|
| A | 34 | 34 | 34 | 37 | 37 | 37 |
| B | 45 | 45 | 45 | 47 | 47 | 47 |
| C | — | 10 | 9.5 | — | — | 9 |
| C (comp.) | 10 | — | — | 10 | 9 | — |
| D | — | — | 0.5 | — | 1 | 1 |
| E/1 | — | — | — | 5 | 5 | 5 |
| E/2 | 10 | 10 | 10 | — | — | — |
| E/3 | 1 | 1 | 1 | 1 | 1 | 1 |
| HDT B [° C.] | 99 | 98 | 99 | 102 | 103 | 103 |
| Mod. of elas. [N/mm²] | 3150 | 3100 | 3160 | 3240 | 3270 | 3300 |
| $\delta_B$ [N/mm²] | 43 | 39 | 56 | 54 | 56 | 71 |
| $\epsilon_b$ [%] | 8 | 8 | 25 | 3.5 | 4.1 | 17.1 |
| $a_k$ [kJ/m²] | 4 | 4 | 9 | 5 | 6 | 11 |
| $W_{s, -30° C.}$ [Nm] | 13 | 11 | 45 | 2 | 2 | 18 |
| $\Delta$ [%] | 57 | 45 | 23 | 56 | 48 | 32 | comp.: Comparative examples

We claim:

1. A thermoplastic molding composition consisting essentially of:

A) from 1 to 97% by weight of a thermoplastic polyester
B) from 1 to 97% by weight of a polycarbonate
C) from 1 to 40% by weight of an elastomer containing oxazoline groups and having a glass transition temperature $(T_g) \leq 0°$ C.
D) from 0.05 to 5% by weight of a bisoxazoline
E) from 0 to 70% by weight of other additives and processing aids, where the total of the percentages by weight of components A) to E) is 100%.

2. A thermoplastic molding composition as claimed in claim 1, containing, as component A), polyalkylene terephthalates derived from alkanediols having from 2 to 10 carbon atoms.

3. A thermoplastic molding composition as claimed in claim 1, in which component C) contains from 0.1 to 5% by weight, based on 100% by weight, of a 2-oxazoline of the formula II

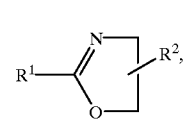

where:

$R^1$ is an aliphatic, cycloaliphatic, aromatic or araliphatic hydrocarbon radical having from 2 to 60 carbon atoms, which may contain hydroxyl, carboxyl or amide groups if desired, $R^2$ is hydrogen or $C_1$–$C_4$-alkyl.

4. A thermoplastic molding composition as claimed in claim 1, containing bisoxazolines D) of the formula IV

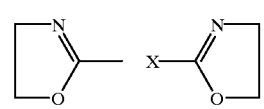

where

X is a saturated, unsaturated, aliphatic or cycloaliphatic radical having from 2 to 60 carbon atoms or an araliphatic or aromatic radical having from 6 to 60 carbon atoms, where X may contain carboxyl and amide groups.

5. A thermoplastic molding composition as claimed in claim 1, containing, as elastomer C), an olefin polymer built up from $C_1$) from 40 to 99.9% by weight of at least one α olefin having from 2 to 8 carbon atoms
$C_2$) from 0 to 50% by weight of a diene
$C_3$) from 0 to 45% by weight of a $C_1$–$C_{12}$-alkyl ester of acrylic or methacrylic acid or mixtures of such esters,
$C_4$) from 0.1 to 5% by weight of a 2-oxazoline of the formula II

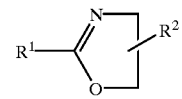

with the proviso that component C) is not an olefin homopolymer.

6. A thermoplastic molding composition as claimed in claim 5, in which the elastomer C) is obtainable by free-radical grafting of the olefin polymer in the presence of initiators in the melt with 2-oxazolines of the formula II

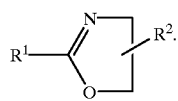
II
7. A thermoplastic molding composition as claimed in claim 1, containing, as elastomer C), vinylaromatic polymers selected from the class consisting of ASA, ABS and HIPS polymers.
8. A molding obtained from the thermoplastic molding compositions as claimed in claim 1.
* * * * *